United States Patent [19]

Paterson

[11] Patent Number: 4,769,645
[45] Date of Patent: Sep. 6, 1988

[54] EXCESSIVE PITCH ATTITUDE WARNING SYSTEM FOR ROTARY WING AIRCRAFT

[75] Inventor: Noel S. Paterson, Bothell, Wash.

[73] Assignee: Sundstrand Data Control, Inc., Redmond, Wash.

[21] Appl. No.: 503,219

[22] Filed: Jun. 10, 1983

[51] Int. Cl.⁴ .............................................. G08B 21/00
[52] U.S. Cl. .................................... 340/946; 340/963; 340/970; 340/967; 73/178 H; 73/178 T; 364/433; 244/17.11
[58] Field of Search ............ 340/27 AT, 27 R, 27 SS, 340/27 NA, 945, 946, 960, 963, 967, 970; 73/178 R, 178 T, 178 H; 244/17.11, 180, 181, 182, 183, 7 TA, 7 A, 7; 364/427, 428, 433; 343/450, 453, 458; 342/450, 453, 458

[56] References Cited

U.S. PATENT DOCUMENTS

| | | | |
|---|---|---|---|
| 4,027,838 | 6/1977 | Barnum | 340/27 R |
| 4,060,793 | 11/1977 | Bateman | 244/180 |
| 4,528,564 | 7/1985 | Trampnau | 340/946 |
| 4,551,723 | 11/1985 | Patterson | 340/970 |

Primary Examiner—John W. Caldwell, Sr.
Assistant Examiner—Tyrone Queen
Attorney, Agent, or Firm—Mason, Kolehmainen, Rathburn & Wyss

[57] ABSTRACT

A system for warning the pilot of a rotary wing aircraft such as a helicopter of a flight condition that, if left uncorrected, would result in the tail of the aircraft striking the ground monitors the altitude above ground, descent rate, pitch and pitch rate of the aircraft and provides a warning if the relationship between the aforementioned parameters is such that a tail strike is imminent.

14 Claims, 1 Drawing Sheet

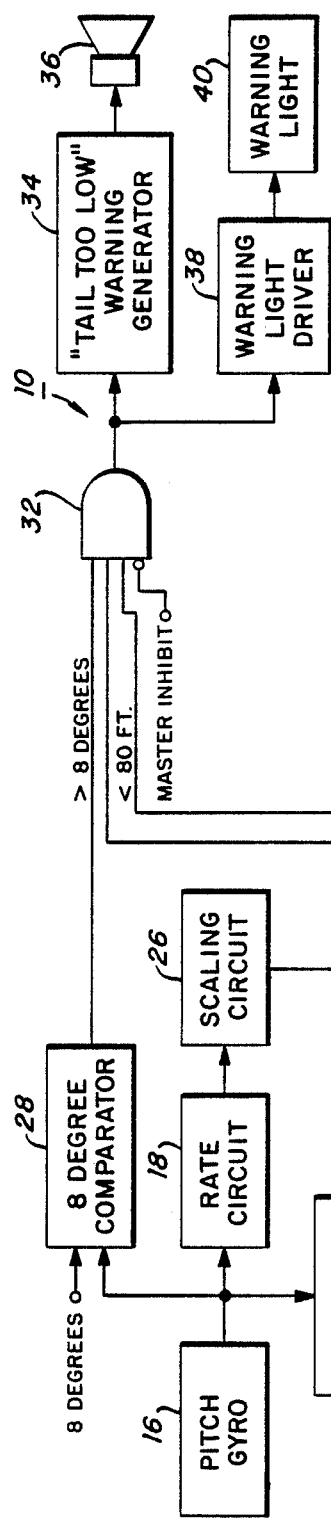
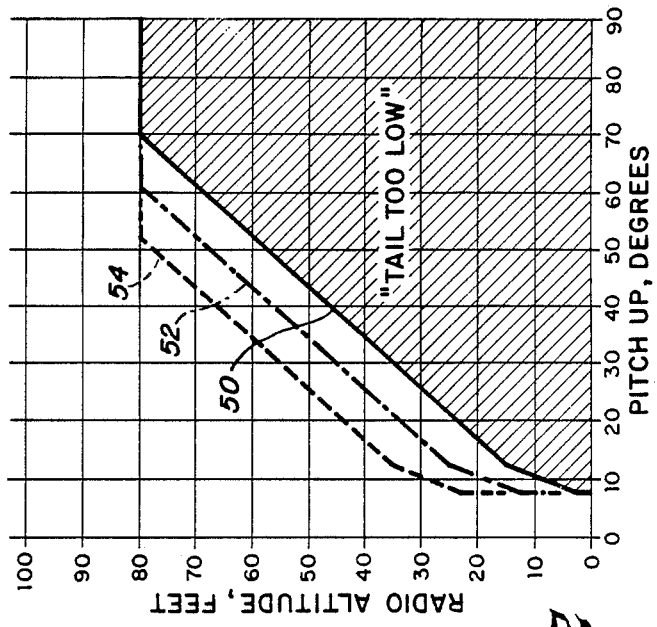
Fig. 1
Fig. 2

EXCESSIVE PITCH ATTITUDE WARNING SYSTEM FOR ROTARY WING AIRCRAFT

BACKGROUND OF THE INVENTION

1. Field of the Invention

This invention relates generally to ground proximity warning systems for aircraft, and more particularly to warning systems for rotary wing aircraft such as helicopters that provide a warning to the pilot of the aircraft if the flight conditions are such that the tail of the aircraft is in danger of striking the ground.

2. Description of the Prior Art

Ground proximity warning systems for rotary wing aircraft such as helicopters, including systems that warn the pilot of an imminent tail strike, are known. Examples of such systems are disclosed in U.S. Pat. Nos. 3,979,717 and 4,027,838. The systems disclosed in the aforementioned references monitor the altitude above ground and pitch of the aircraft and generate a warning in the event that the pitch of the aircraft is excessive for the altitude at which the aircraft is flying. The systems also monitor the rate of descent of the aircraft and raise the altitude at which the warning is generated as a function of the descent rate to assure that the warning is generated early enough to give the pilot sufficient time to take corrective action. Other systems vary the altitude at which the warning is generated as a function of the vertical movement of the tail of the aircraft, which is a function of both the descent rate and the pitch rate further to improve the warning time.

While these systems do provide a warning to indicate that a tail strike is imminent, they also tend to generate false or nuisance warnings under normal flight conditions when there is no real danger of the tail striking the ground, thus losing their effectiveness because pilots then tend to ignore real warnings.

SUMMARY OF THE INVENTION

Accordingly, it is an object of the present invention to provide an improved ground proximity warning system for rotary wing aircraft that overcomes many of the disadvantages of the prior art systems.

It is another object of the present invention to provide a ground proximity warning system that warns to the pilot of a rotary wing aircraft such as a helicopter of an imminent tail strike, but minimizes the number of false or nuisance warnings generated.

It is yet another object of the invention to provide a ground proximity warning system wherein the amount of pitch permitted before a warning is generated is adjusted as a function of altitude above ground in a manner to provide adequate warning time without generating an appreciable number of false or nuisance warnings.

One problem associated with vertical takeoff and landing rotary wing aircraft such as helicopters is that such aircraft can attain relatively high pitch angles, particularly during landing and air taxiing, and if the aircraft descends too low when flying at a high pitch angle, the tail of the aircraft can strike the ground. Such a ground strike is dangerous and potentially destructive to the aircraft, particularly in the case of helicopters of the type that have a tail rotor whose blades extend below the tail of the helicopter.

Therefore, there is provided an improved ground proximity warning system that monitors the pitch angle of the aircraft as well as the altitude above the ground of the aircraft and generates a warning if the pitch of the aircraft is excessive for the altitude at which the aircraft is flying. The pitch angle required to generate the warning is optimized as a function of altitude above ground to provide adequate warnings without generating appreciable false or nuisance warnings. All warnings below a predetermined pitch rate, for example, 8 degrees, are inhibited in order to eliminate false warnings that can occur during air taxiing down wind where high pitch attitudes are normally encountered. In addition, the altitude above ground at which the warning is given is raised as a function of the descent rate and pitch-up rate to provide additional warning time when appreciable descent rates and pitch rates are encountered.

DESCRIPTION OF THE DRAWING

These and other objects and advantages of the present invention will become readily apparent upon consideration of the following detailed description and attached drawing wherein:

FIG. 1 is a functional block diagram of one implementation of the warning system according to the invention; and FIG. 2 is a graph illustrating the relationship between radio altitude and pitch-up that the aircraft must attain to generate a warning.

DETAILED DESCRIPTION OF THE PREFERRED EMBODIMENT

A system according to the invention capable of providing the warning described above without generating excessive false warnings is illustrated in FIG. 1 and generally designated by the reference numeral 10. The system 10 according to the invention is illustrated in FIG. 1 in functional or logical block diagram form as a series of gates, comparators and the like for purposes of illustration; however, it should be understood that the actual implementation of the logic can be other than as shown in FIG. 1, with various digital and analog implementations being possible. The signals utilized by the warning system as described include radio altitude, altitude rate, a signal representative of the pitch of the aircraft, a signal representative of the pitch rate of the aircraft and various validity signals.

Depending on the type of aircraft in which the warning system is installed, the signals shown in FIG. 1 can be obtained from individual instruments such as a radio altimeter 12, a barometric altimeter 13, a barometric altimeter rate circuit 14, which may include, for example, a differentiating circuit that provides a signal representative of the rate of change of the signal from the barometric altimeter 13, a pitch gyro 16, a pitch rate circuit 18, which may also include a differentiator, and various validity signals which may be combined as a MASTER INHIBIT signal. Alternatively, these signals may be obtained from a digital data bus in certain newer aircraft.

In order to determine whether or not the pitch of the aircraft is excessive for the altitude at which the aircraft is flying, signals representative of the pitch of the aircraft and the altitude above the ground of the aircraft from the pitch gyro 16 and the radio altimeter 12 are applied to a mode comparator 20, the latter signal being applied to the mode comparator 20 via a combining circuit 22 whose function will be described in a subsequent portion of the specification. For purposes of discussion, an excessive pitch condition shall be defined as an excessive pitch-up condition wherein the nose of the aircraft is pitched up and the tail is pitched down so that the tail can strike the ground in the event that the aircraft descends to an excessively low altitude for the pitch angle at which it is flying.

In addition, a signal representative of the barometric altitude rate is applied to the mode comparator 20 from the rate circuit 14 via a combining circuit 24 and the combining circuit 22. The rate circuit 18 is also coupled to the mode comparator 20 via a scaling circuit 26 and the combining circuits 22 and 24. An 8 degree comparator is coupled to the pitch gyro 16, and an 80 foot comparator 30 is coupled to the radio altimeter 12. The outputs of the comparators 20, 28 and 30 are coupled to an AND gate 32 which controls a voice generator 34 which applies a "TAIL TOO LOW" or similar voice warning to a transducer 36. The transducer 36 may be either an earphone or a loudspeaker, and may receive the "TAIL TOO LOW" signal either directly from the TAIL TOO LOW generator, or via the intercom of the aircraft. The AND gate 32 may also be used to control a warning light driver 38 that controls a warning light 40.

In operation, the mode comparator 20 compares the signal representative of the pitch angle of the aircraft from the pitch gyro 16 with the signal representative of the altitude above ground of the aircraft from the radio altimeter 12. Assuming that the pitch and altitude of the aircraft remain constant, the mode comparator determines the pitch of the aircraft and causes a warning to be generated if the pitch is excessive for the radio altitude at which the aircraft is flying solely on the basis of pitch angle and altitude. However, in typical flight conditions where the pitch and altitude are not constant, the vertical velocity of the tail of the aircraft is important in determining whether a tail strike is imminent. The vertical velocity is a function of two factors. One of the factors is the descent rate of the aircraft which is directly proportional to the vertical velocity of the tail. The other factor that determines the vertical velocity of the tail is a function of the pitch rate of the aircraft and the moment arm defined by the distance between the center of gravity of the aircraft and the tail of the aircraft. Consequently, the vertical velocity of the tail as a function of pitch is determined by scaling the pitch rate signal received from the pitch rate circuit by the scaling circuit 26, which scales the rate signal as a function of the moment arm or length of the tail of the aircraft in order to provide a signal representative of vertical velocity of the tail. Conveniently, for large helicopters, such as the Sikorsky CH53 and similar large helicopters, the pitch moment is such that the tail moves approximately one foot vertically per degree of pitch.

The signal from the barometric altitude rate circuit 14 and the scaling circuit 26 are combined by the combining circuit 24 which provides a signal representative of the vertical movement of the tail resulting from the combined action of the descent rate and the pitch rate of the aircraft. The combiner 24 is designed so that only descent rates and pitch-up rates are combined, and ascent rates and pitch rates tending to raise the tail are ignored. This combined signal is then combined with the radio altitude signal from the radio altimeter 12 by the comparator 22 in such a manner so as to reduce the apparent radio altitude signal applied to the mode comparator 22. This causes a warning to be generated at higher altitudes when descent rate and pitch rates tending to lower the tail of the aircraft are present. In the illustrated embodiment, the combiners 22 and 24 are used to combine the scaled pitch rate and descent rate signals and to adjust the magnitude of the radio altimeter signal applied to the mode comparator 20 in order to effect the increase in warning altitude when pitch-up and descent rate conditions are present; however, the pitch rate and barometric rate circuits 18 and 14 could be applied directly to the mode comparator 20 which could be provided with digital or analog circuitry to effect the compensation. Also, a radio altitude rate signal could be used instead of the barometric altitude signal to provide the altitude adjustment.

In accordance with another important aspect of the invention, the signal from the pitch gyro 16 is compared with a reference signal representative of 8 degrees of pitch-up by the comparator 28. The comparator 28 monitors the pitch of the aircraft and provides an enabling signal to the AND gate 32 only when the pitch of the aircraft exceeds 8 degrees of pitch-up. This is particularly important, because in certain low level manuevers, such as, for example, air taxiing where the aircraft taxis a few feet above the ground, the pitch angle can readily approach 8 degrees. This is particularly true for air taxiing down wind where the nose of the aircraft must be pitched up to slow the horizontal velocity of the aircraft. Consequently, the 8 degree comparator 28 disables the warning system as long as the pitch angle is less than 8 degrees to avoid false or nuisance warnings under such flight conditions.

The 80 foot comparator 30 compares the signal from the radio altimeter 12 with a reference signal representative of a predetermined maximum operating altitude, for example, 80 feet, and enables the gate 32 only when the aircraft is flying below the predetermined maximum altitude. This is done because the warning mode is not necessary when the aircraft has ascended to a sufficiently high altitude that it is impossible for the tail to strike the ground, and nuisance warnings that may be caused by spurious signals or unusual flying conditions are avoided. Finally, a master inhibit signal is applied to the AND gate 32 and serves to disable the AND gate 32 in the event that any of the instruments providing signals to the warning system are defective.

Thus, if the master inhibit signal is not present, the pitch angle of the aircraft is greater than 8 degrees and the aircraft is flying below 80 feet above the ground, the gate 32 is under the control of the mode comparator 20 which causes the gate 22 to initiate a warning if the aircraft is flying in a hazardous flight condition. Because such a warning system is generally used in conjunction with other warning systems, it is desirable to provide a specific warning to the pilot so that he may immediately diagnose the hazardous condition and take corrective action. In the present embodiment, a voice warning such as, for example, "TAIL TOO LOW" is used to alert the pilot of the specific hazardous condition that exists; however, other similar warnings can be provided. In addition, a visual indication may be provided via a warning light such as the light 40 which is driven by the warning light driver 38.

The exact relationship between the altitude above ground, or radio altitude and the amount of pitch-up required to generate a warning is illustrated by the shaded portion of FIG. 2. In the graph illustrated in FIG. 2, the innermost graph represents the conditions required to generate a warning when the combined ascent rate and pitch rate result in no vertical motion of the tail. It has been found through extensive analysis that the two-slope curve illustrated in FIG. 2 provides an optimum balance between adequate warning time and nuisance warnings.

In the graph illustrated in FIG. 2, the straight line segment defining the warning boundary below 15 feet of radio altitude is defined by the equation:

$$H\ WARN = 21 + 3 \times PITCH,$$

wherein H WARN is the radio altitude at which the warning is generated, and PITCH is the pitch-up angle of the aircraft in degrees. This line segment intersects the vertical 8 degree cut-off line at approximately 3 feet of radio altitude.

Above 15 feet of radio altitude, the warning criteria are relaxed to permit greater pitch angles, with the line segment defining the warning boundary being defined by the equation:

$$H\ WARN = 1.55 + 1.12 \times PITCH$$

This line segment intersects the lower line segment at a pitch angle of approximately 12 degrees, and intersects the 80 foot cut-off at a pitch angle of approximately 70 degrees. The lower line segment is steeper than the upper line segment because the vertical displacement of the tail per degree of pitch angle is greater at low pitch angles than for high pitch angles.

As previously discussed, the altitude at which a warning is generated is increased as a function of descent rate and pitch rate of the aircraft in order to compensate for the vertical movement of the tail caused by the descent and pitch of the aircraft. In the present embodiment, the altitude at which a warning is given is increased by one foot for each foot per second of vertical movement of the tail caused by the combined action of the descent rate and pitch rate, ignoring ascent rates and pitch rates that tend to raise the tail. For example, if only a descent rate were present, but no pitch rate were present, the warning curve 50 would be raised by one foot for each foot per second of descent rate present, thus in effect giving the pilot an additional one second of warning time. Similarly, if only a pitch rate but no descent rate were present, the warning curve 50 would be raised one foot for each degree per second of pitch-up rate (assuming a moment arm that results in one foot of vertical tail motion per degree). Again, this would provide the pilot with an additional one second of warning time. If both a pitch rate and a descent rate were present, the warning envelope would be adjusted on the basis of the combined action of the descent and pitch rates. For example, if as in the previous example, the descent rate were one foot per second and the pitch-up rate were one degree per second, the combined action would result in two feet per second of vertical movement of the tail, and consequently, the warning envelope would be increased by two feet to provide the pilot with the additional one second warning time. However, if there was an ascent rate of one foot per second and a pitch-up rate of one degree per second, the ascent rate would be ignored and the curve 50 would be raised only one foot to compensate for the pitch rate. Similarly, a pitch rate tending to raise the tail would also be ignored. This effect is illustrated by the curves 52 and 54 of FIG. 2 which represent increases in the warning altitude by 10 and 20 feet caused by 10 and 20 feet per second combined vertical tail movement, respectively. Note however, that the 80 foot cut-off remains constant.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for rotary wing aircraft for generating a warning of an imminent contact of the tail of the aircraft with the ground comprising:
    means for providing a signal representative of the altitude of the aircraft above the ground;
    means for providing a signal representative of the descent rate of the aircraft;
    means for providing a signal representative of the pitch angle of the aircraft;
    means for providing a signal representative of the rate of change of the pitch angle of the aircraft; and
    means responsive to said altitude signal providing means, said descent rate signal providing means, said pitch angle signal providing means and to said rate of change of pitch angle signal providing means for generating a warning of an imminent tail strike when the pitch angle is greater than approximately 8 degrees and the relationships between altitude, pitch angle, descent rate and rate of change of pitch rate is such that a tail strike is imminent.

2. A warning system as recited in claim 1 wherein said warning generating means includes means for generating the warning at an altitude of approximately 3 feet above ground when the pitch rate is approximately 8 degrees, means for generating the warning at an altitude of approximately 15 feet above ground when the pitch rate is approximately 12 degrees, and means for generating said warning at an altitude of approximately 80 feet when the pitch rate is approximately 70 degrees.

3. A warning system as recited in claim 2 wherein said warning generating means includes means for increasing the altitude required to generate the warning linearly as a function of pitch angle between 8 and 12 degrees of pitch angle, and between 12 and 70 degrees of pitch angle.

4. A warning system as recited in claim 2 wherein said warning generating means includes means for raising the altitude at which the warning is given by one foot for every foot per second of descent rate.

5. A warning system as recited in claim 4 wherein said warning generating means includes means for raising the altitude at which the warning is generated by one foot for each degree per second of pitch rate tending to bring the tail of the aircraft closer to the ground.

6. A warning system as recited in claim 2 wherein said warning generating means includes means for raising the altitude at which the warning is generated by one foot for each degree per second of pitch rate tending to bring the tail of the aircraft closer to the ground.

7. A warning sytem as recited in claim 1 wherein said altitude signal providing means includes a radio altimeter, and wherein said descent rate signal providing means includes means for providing a signal representative of the barometric descent rate of the aircraft.

8. A warning system for rotary wing aircraft for generating a warning of an imminent contact of the tail of the aircraft with the ground comprising:
    means for providing a signal representative of the altitude of the aircraft above the ground;

means for providing a signal representative of the pitch angle of the aircraft; and means responsive to said altitude signal providing means and said pitch angle signal providing means for generating a warning of an imminent tail contact when the pitch angle is greater than approximately 8 degrees and the altitude above the ground of the aircraft less than approximately 3 feet, when the pitch angle is greater than approximately 12 degrees and the altitude above ground of the aircraft is less than approximately 15 feet, and when the pitch angle is greater than approximately 70 degrees when the altitude above ground of the aircraft is less than approximately 80 feet, wherein the altitude above ground at which the warning is given increases as a function of pitch angle between pitch angles of approximately 8 degrees and approximately 70 degrees.

9. A warning system as recited in claim 8 wherein said warning means includes means for linearly increasing the altitude above ground at which the warning is given as a function of pitch angle between pitch angles of approximately 8 degrees and 12 degrees and between pitch angles of approximately 12 degrees and 70 degrees.

10. A warning system as recited in claim 9 further including means for providing a signal representative of the descent rate of the aircraft, wherein said warning means includes means responsive to said descent rate signal providing means for raising the altitude at which the warning is generated by one foot for every foot per second of descent rate of the aircraft.

11. A warning system as recited in claim 10 wherein said descent rate signal providing means includes means for providing a signal representative of the barometric descent rate of the aircraft.

12. A warning system as recited in claim 9 further including means for providing a signal representative of the pitch rate of the aircraft, wherein said warning generating means includes means responsive to the pitch rate signal providing means for increasing the altitude at which a warning is generated by one foot for each increment of pitch rate tending to lower the tail by approximately one foot per second.

13. A warning system as recited in claim 9 wherein said system includes means for providing a signal representative of the pitch rate of the aircraft, and wherein said warning generating means includes means responsive to the pitch rate signal providing means for increasing the altitude above ground at which the warning is generated by one foot for each degree per second of pitch rate tending to bring the tail of the aircraft toward the ground.

14. A warning system as recited in claim 9 further including means for providing a signal representative of the descent rate of the aircraft, means for providing a signal representative of the pitch rate of the aircraft, combining means responsive to said descent rate signal providing means and to said pitch rate signal providing means for providing a combined signal representative of the vertical velocity of the tail of the aircraft, wherein said warning generating means is responsive to said combined signal for raising the altitude at which the warning is generated by one foot for each foot per second of downward velocity of the tail of the aircraft.

* * * * *